(12) United States Patent
Wheeler

(10) Patent No.: US 6,234,491 B1
(45) Date of Patent: May 22, 2001

(54) TOOL LINER

(75) Inventor: Dale K. Wheeler, Fallston, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 09/365,954

(22) Filed: Aug. 2, 1999

(51) Int. Cl.[7] .............. B23B 31/20; B23B 31/22
(52) U.S. Cl. .......... 279/143; 279/43.6; 279/46.6; 279/75; 279/905
(58) Field of Search ............... 279/43.6, 46.6, 279/143, 145, 151, 152, 904, 75, 905, 46.1–46.3, 46.5, 49, 54, 57

(56) References Cited

U.S. PATENT DOCUMENTS

| | | | |
|---|---|---|---|
| 315,326 | * 4/1885 | Parsons | 279/43.6 |
| 2,689,740 | * 9/1954 | Parigian | 279/46.6 |
| 4,690,641 | * 9/1987 | Luiset et al. | 279/75 |
| 5,221,099 | * 6/1993 | Jansch | 279/151 |
| 5,403,132 | * 4/1995 | Truesdell | 279/145 |
| 5,601,295 | * 2/1997 | Baker | 279/46.5 |

* cited by examiner

Primary Examiner—Steven C. Bishop
(74) Attorney, Agent, or Firm—Harness, Dickey & Pierce, P.L.C.

(57) ABSTRACT

A liner for a power tool holder has a wall which defines an interior and an exterior periphery. The interior periphery is sized to receive a tool shaft and the exterior periphery is sized to fit within a tool holder. The liner protects the tool shafts from marring, nicking or the like while being frictionally held by the tool holder.

18 Claims, 3 Drawing Sheets

TOOL LINER

BACKGROUND OF THE INVENTION

The present invention relates to power tools and, more particularly, to a liner to protect tools or bits from marring or nicking while in a tool holder of a power tool.

In power tools, specifically hobby tools, routers and rotating power tools, it is desirable to utilize various types of tools and/or bits. Ordinarily, these tools have some type of working head and an elongated shaft to be maintained in the power tool. Depending upon the tool head holder, the tool shafts are sized to be received in the holders. In the event that the tool shaft has a diameter, different than what is normally received by the tool holder, another tool holder is substituted on the power tool so that the tool may be retained in the power tool.

The tool holders utilize locking elements, such as balls, which are biased in the tool holder to maintain the tool in the holder. The elements apply a holding force onto the tool shafts to maintain the tools within the tool holder. In the event the biased elements are balls or the like, the balls may have a tendency to mar or nick the shaft of the tool. Thus, it is desirable to protect the tool shafts from marring, nicking or the like by the tool holders.

Accordingly, it is an object of the present invention to provide a liner which protects tools shafts from marring, nicking or the like. The liner of the present invention may also increases the friction holding force of the tool within the liner.

Accordingly, in accordance with a first aspect of the present invention, a liner for a tool holder comprises a hollow member with a wall defining an interior periphery and an exterior periphery. The interior periphery is sized to receive a tool and the exterior periphery is sized to fit within a tool holder. The hollow member includes two arcuate portions which define an elongated overall cylindrical configuration. Each arcuate portion includes at least one axial slot. The slots enable a reduced force to insert the tool into the hollow member. The exterior periphery of each arcuate member includes one or more axial grooves. A plurality of members project from the interior periphery of the hollow member to contact the tool. This provides increased frictional holding of the tool within the hollow member. The projection members surround the interior periphery to provide a corrugated pattern. One of the arcuate portions is thicker than the other. Both arcuate portions have the same thickness at their grooves so that the cam sleeve roll out tracks with the tool bit roll out. One arcuate portion defines an arc of about 200° and the other arcuate portion defines an arc of about 150°.

In accordance with a second embodiment of the present invention, a power tool comprises a housing with a motor within the housing. A power source is coupled with the motor. An output member is likewise coupled with the motor. An actuation member is coupled with the power source and the motor to power the motor which, in turn, rotates the output member. A tool holder is coupled with the output member. A tool, which includes a shank, is coupled with the tool holder. A liner is in the tool holder. The liner comprises a hollow member with a wall defining an interior periphery and an exterior periphery. The interior periphery is sized to receive a tool and the exterior periphery is sized to fit within a tool holder. The hollow member includes two arcuate portions which define an elongated overall cylindrical configuration. Each arcuate portion includes at least one axial slot. The slots enable a reduced force for inserting the tool into the hollow member. The exterior periphery of each arcuate member includes one or more axial grooves. A plurality of members project from the interior periphery of the hollow member to contact the tool. This provides increased frictional holding of the tool within the hollow member. The projection members surround the interior periphery to provide a corrugated pattern. One of the arcuate portions is thicker than the other. Both arcuate portions have the same thickness at the grooves. One arcuate portion defines an arc of about 200° and the other arcuate portion defines an arc of about 150°.

Additional objects and advantages of the invention will become apparent from the detailed description of the preferred embodiment, and the appended claims and accompanying drawings, or may be learned by practice of the invention.

DETAILED DESCRIPTION OF THE PREFERRED EMBODIMENT

Figure 1:
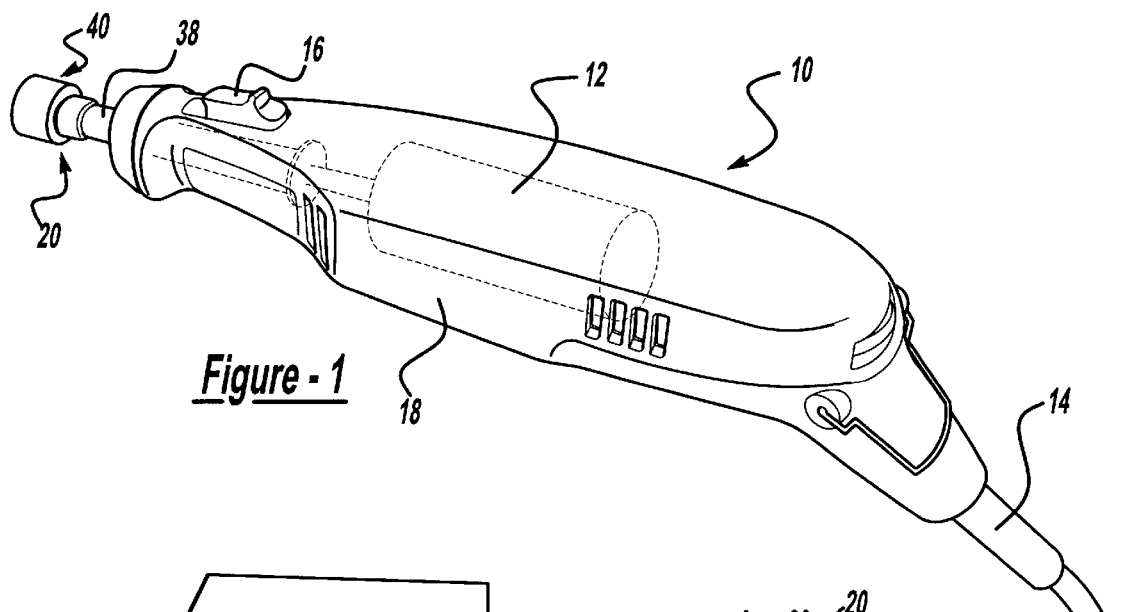
FIG. 1 is a perspective view of a power tool with a tool and a liner in accordance with the present invention.
Figure 3:
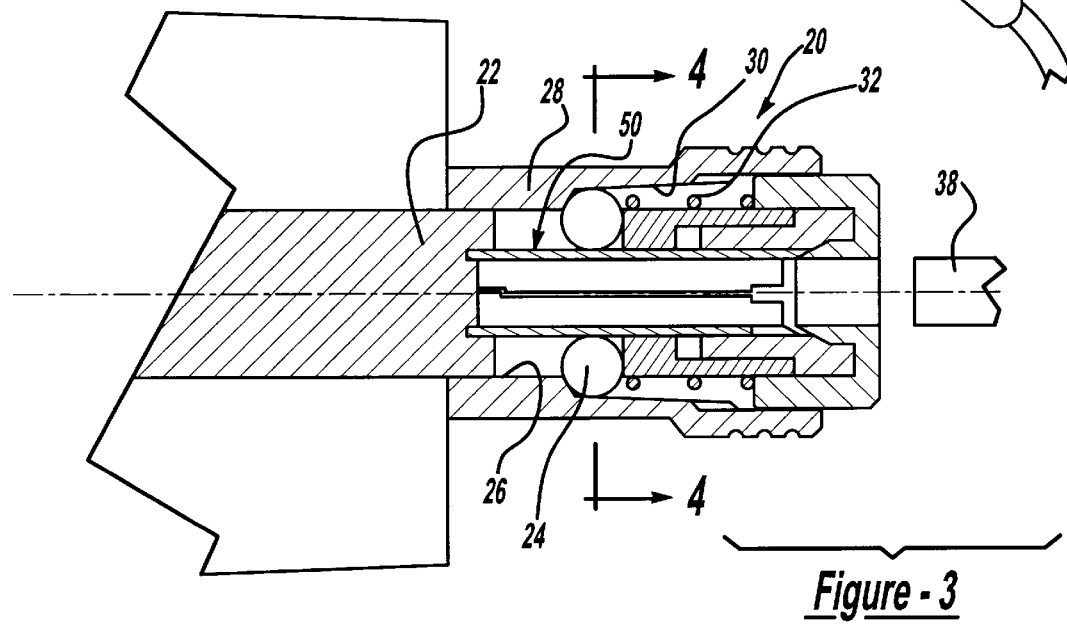
FIG. 3 is a cross-section view of FIG. 1 along line 3—3 thereof.
Figure 4:
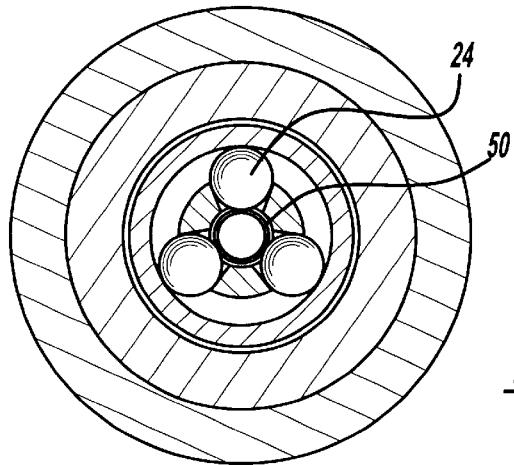
FIG. 4 is a cross-section view of FIG. 3 along line 4—4 thereof.

Turning to the figures, particularly FIG. 1, a power tool is illustrated and designated with the reference numeral 10. The power tool 10 is a rotary or router tool including a motor 12 which may be energized by a battery or cord 14. An activation button 16 enables the power tool to be energized and rotates the motor 12. The motor 12 has electrical connections between the activation button 16 and the power source 14 and are enclosed by a housing 18. A tool holder 20 is coupled with an output spindle 22 of the power tool 10.

Figure 2:
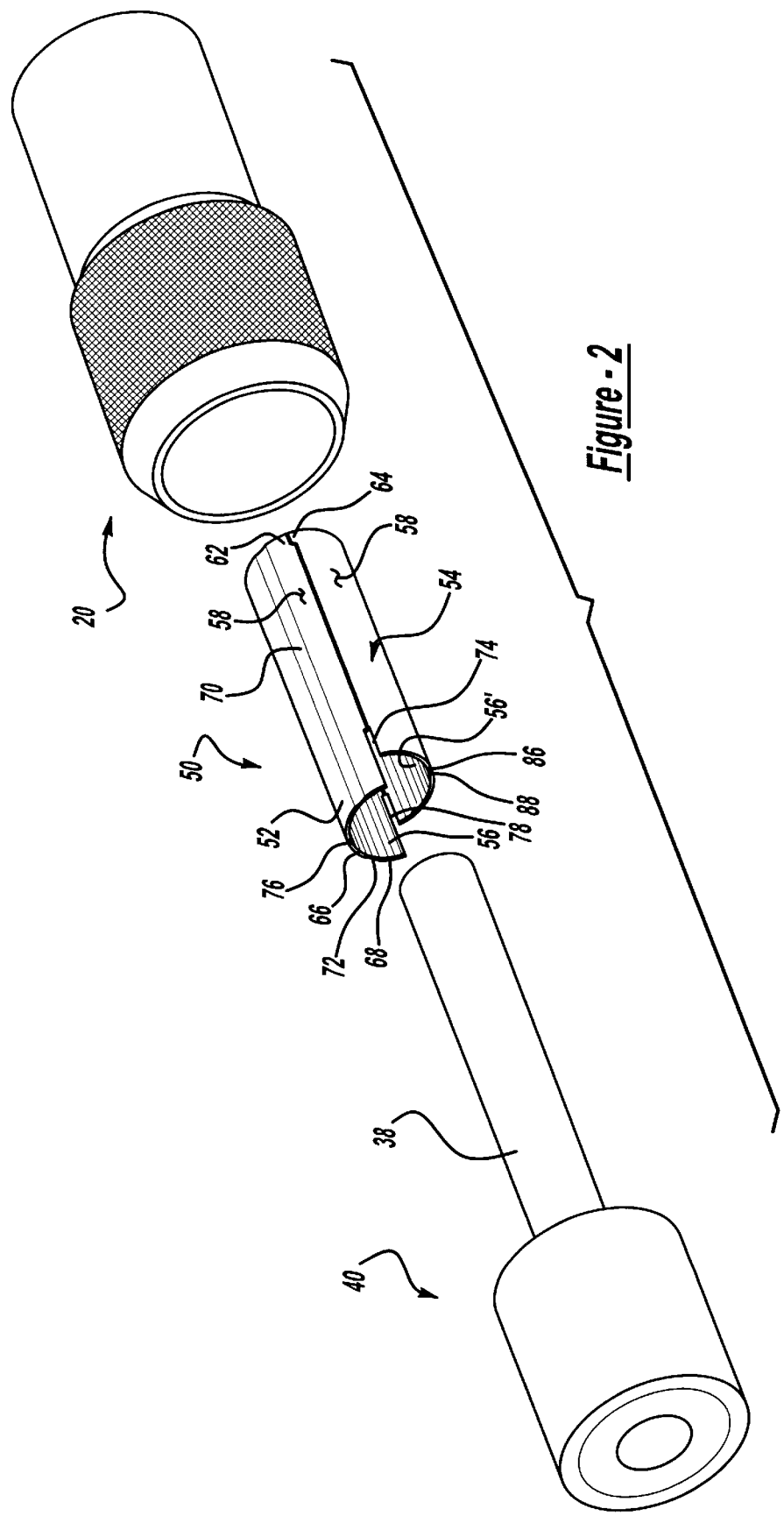
FIG. 2 is an exploded view of the tool and liner in accordance with the present invention.
Figure 5:
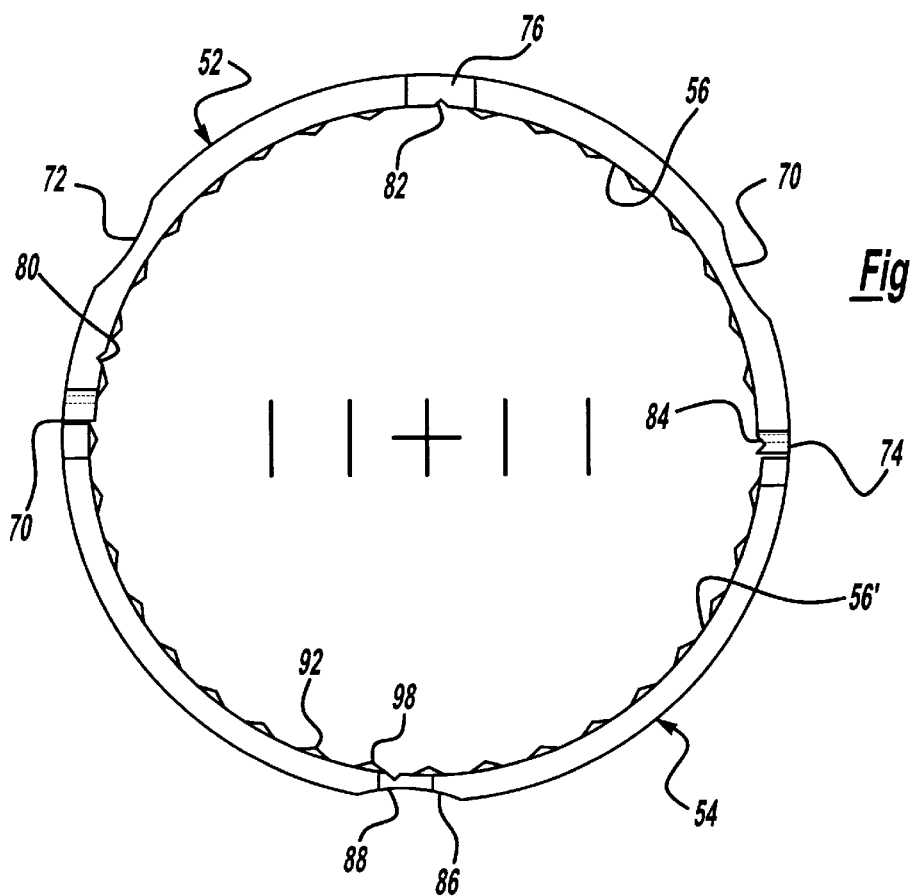
FIG. 5 is an end view of the liner of FIG. 2.
Figure 6:
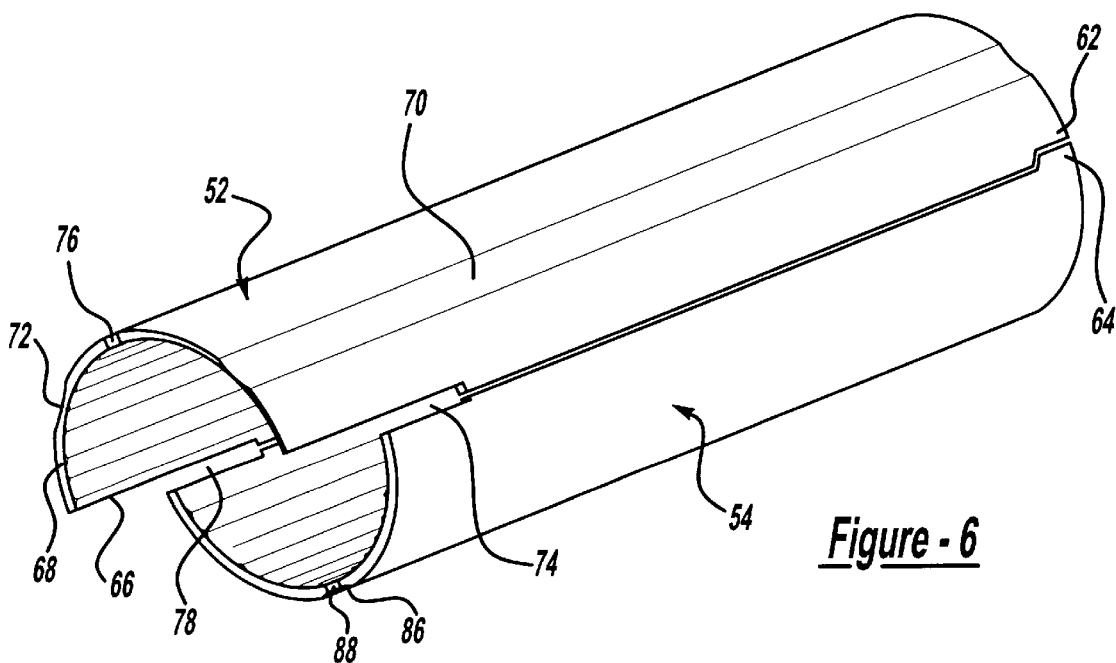
FIG. 6 is a perspective view of the liner of FIG. 2.

The tool holder 20 includes a plurality of balls/rolls 24 which project through apertures 26 in the spindle 22. A sleeve 28 which has a surface 30 in contact with the balls is biased by a spring 32 to maintain contact of the balls with the shaft 38 of the tool 40. As can be seen in FIG. 2, a liner 50 surrounds a portion of the tool shaft 38 and is contacted by the balls 24 in the spindle bore.

The liner 50 may be manufactured from material harder than the shaft so that when force from the balls is applied onto the liner 50, the shaft 38 will not be marred by the balls.

Turning to FIGS. 2–6, a better understanding of the liner 50 may be had. Liner 50 is comprised of two arcuate wall portions 52 and 54 which form the hollow cylindrical liner 50. Both arcuate wall portions 52, 54 include an interior surface 56, 56' and an exterior surface 58, 58'. The hollow liner 50 is elongated and has an overall cylindrical shape. The hollow liner 50 defines the longitudinal axis 60.

The arcuate portion 52 defines an arc of about 200°. By going beyond 180°, the ends of the arcuate portion 52 force the arcuate portion 52 against the bore of the tool holder 20. A complementary member 62 is at one axial end of the arcuate portion 52. The complementary member 62 mates with a complementary member 64 in the second arcuate portion 54 to enable the two members to pivot along the longitudinal axis with respect to one another. At the other axial end, the arcuate portion 52 includes a projecting member 66. The projecting member 66 is likewise arcuate and has an angled end 68 which is abutted by the tool holder sleeve to axially lock the arcuate portion 52 in position in the tool holder sleeve.

A pair of grooves 70 and 72 are on the external arcuate surface of the arcuate portion 52. The grooves 70 and 72 are defined by a radius which is equal to or greater than the radius of the balls 24. The two balls 24 are for friction reduction purposes and do not provide a clamping effect on the arcuate portion 52.

The arcuate portion 52 also has a desired thickness. The thickness is greater than the thickness of the second arcuate portion 54. The thickness at the grooves 70 and 72, however, is the same as that at the groove of the second arcuate portion 54. A plurality of slots 74, 76 and 78 are formed along the periphery of the arcuate portion 52. Slots 74 and 78 are along the parting line or the sides of the arcuate portion 52. Slot 76 is formed between slots 72 and 78 at approximately a 90° position along the arc. The slots 74, 76 and 78, while enhancing the insertion of a tool within the liner 50, also serve to retain rectangular cables of a flex cable for a rotary tool. Also, coined surfaces 80, 82 and 84 help to receive and maintain the rectangular cable in the liner 50.

The second arcuate portion 54 is similar to arcuate portion 52. However, the arc defined by the member 54 is about 150°. Also, as previously mentioned, at the one axial end, a complementary member 64 is contacted with complementary member 62 of the first arcuate portion 52 to enable pivoting of the second arcuate portion 54 with respect to the first arcuate portion 52. The arcuate portion 54 is axially shorter than the arcuate portion 52 to enhance pivoting. Also, a gap of about 0.005 five thousandths inch is formed between the axial side edges of the arcuate portions 52 and 54. This gap enables the arcuate portion 54 to be moved inward with respect to the fixed arcuate portion 52.

The arcuate portion 54 includes a single ball groove 86 which is approximately positioned at a 90° position between the ends of the arcuate portion 54. The ball riding in the groove clamps the arcuate portion 54 against the arcuate portion 52. As mentioned, the groove 86 may be arcuate and be the same size as the ball or the radius slightly larger. The arcuate portion 54 has a thickness which is less than the thickness of the arcuate portion 52. Also, a slot 88 is formed on the one axial end of the arcuate portion 54 to enhance insertion and enable retention of the rectangular cable as mentioned above.

The thickness of the arcuate portions 52 and 54 is important in controlling the parallel and angular run-out of the tool. By having thickness of the arcuate portion 54 less than the arcuate portion 52 and the thicknesses of the ball grooves the same, this enables the axis of the tool to be moved left or right off axis, yet still parallel to the axis of the tool holder. This is due in part to the variance or tolerance of the bore, tool shaft, and the arcuate portions 52 and 54. By having the arcuate portions at an unequal thickness, it allows one of the arcuate portions to compensate for the tolerances of the above parts. By compensating for the tolerances, the arcuate portions in turn enable the axis of the tool to vary between a left limit and a right limit in the tool holder. Thus, the tool axis is at a much closer tolerance than would otherwise be had if the arcuate portions were at the same thickness. At the same thickness, the axis of the tool is to one side or the other in the tool holder but not from left to right as in the present invention. At one side or the other, the tolerance is much larger. It has been found that by having the thickness of the one arcuate portion with respect to the other of about three thousandths inch, that this will enable the axis of the tool to be moved left to right. Also, by having the groove thickness the same, this enables the outer chuck sleeve to track with the tool so that the sleeve runs left to right at a minimum like the tool.

Alternatively, the arcuate portions may include a plurality of alternating furrows 92 and ridges 98 which form a corrugated pattern about the periphery of the interiors of the arcuate portions. The ridges provide a friction surface which contacts the tool shaft and enhances the frictional holding of the tool shaft within the arcuate portions.

While the above detailed description describes the preferred embodiment of the present invention, the invention is susceptible to modification, variation, and alteration without deviating from the scope and fair meaning of the subjoined claims.

What is claimed is:

1. A liner for a tool holder, comprising:

a hollow member having a wall defining an interior periphery and an exterior periphery;

said interior periphery being sized to receive a tool shaft and said exterior periphery being sized to fit within a tool holder; and said hollow member protecting the tool from damage such as marring or nicking, said hollow member including two arcuate portions defining an elongated overall cylindrical configuration and said two arcuate portions having a thickness, one arcuate portion having a thickness greater than the other arcuate portion.

2. The liner according to claim 1, wherein each arcuate portion includes at least one axial slot for enabling reduced insertion force to be applied on the tool for insertion of the tool into said hollow member.

3. The liner according to claim 1, wherein said exterior periphery of one arcuate portion includes one axial groove and the other arcuate portion includes one or more axial grooves for enhancing coupling with the tool holder.

4. The liner according to claim 1, wherein a plurality of members projecting from said interior periphery for contacting the tool within said hollow member for providing increased friction holding the tool within said hollow member and said projecting members surround said interior periphery providing a corrugated pattern.

5. The liner according to claim 3, wherein said both arcuate portions have the same thickness at the grooves.

6. The liner according to claim 3, wherein one arcuate portion defining an arc of about 200° and the other arcuate portion defining an arc of about 150°.

7. The liner according to claim 1, wherein said arcuate portions having mating ends enabling pivoting about said ends.

8. A power tool comprising:

a housing;

a motor in said housing;

a power source coupled with said motor;

an output member coupled with said motor;

an activation member coupled with said power source and said motor for powering said motor which, in turn, rotates said output member;

a tool holder coupled with said output member;

a tool including a shank coupled with said tool holder; and a liner on said tool shank, said liner comprising:

a hollow member having a wall defining an interior periphery and an exterior periphery;

said interior periphery being sized to receive a tool shaft and said exterior periphery being sized to fit within a tool holder; and said hollow member protecting the tool from damage such as marring or nicking, said hollow member includes two arcuate portions which define an elongated overall cylindrical configuration and said two arcuate portions having a thickness, one arcuate portion having a thickness greater than the other arcuate portion.

9. The power tool according to claim 8, wherein each arcuate portion includes at least one axial slot for enabling reduced insertion force to be applied on the tool for insertion of the tool into said hollow member.

10. The power tool according to claim 8, wherein said exterior periphery of one arcuate portion includes one axial groove and the other arcuate portion includes one or more axial grooves for enhancing coupling with the tool holder.

11. The power tool according to claim 8, wherein a plurality of members projecting from said interior periphery for contacting the tool within said hollow member for providing increased friction holding the tool within said hollow member and said projecting members surround said interior periphery providing a corrugated pattern.

12. The power tool according to claim 10, wherein said both arcuate portions have the same thickness at the grooves.

13. The power tool according to claim 10, wherein one arcuate portion defining an arc of about 200° and the other arcuate portion defining an arc of about 150°.

14. The power tool according to claim 8, wherein said arcuate portions having mating ends enabling pivoting about said ends.

15. A liner for a tool holder, comprising:

a hollow member having a wall defining an interior periphery and an exterior periphery;

said interior periphery being sized to receive a tool shaft and said exterior periphery being sized to fit within a tool holder; and said hollow member protecting the tool from damage such as marring or nicking, said hollow member includes two arcuate portions which define an elongated overall cylindrical configuration, said two arcuate portions define an arc dimension, said arc dimensions being different from one another.

16. The liner according to claim 15, wherein one arcuate portion defining an arc of about 200° and the other arcuate portion defining an arc of about 150°.

17. A power tool comprising:

a housing;

a motor in said housing;

a power source coupled with said motor;

an output member coupled with said motor;

an activation member coupled with said power source and said motor for powering said motor which, in turn, rotates said output member;

a tool holder coupled with said output member;

a tool including a shank coupled with said tool holder; and a liner on said tool shank, said liner comprising:

a hollow member having a wall defining an interior periphery and an exterior periphery;

said interior periphery being sized to receive a tool shaft and said exterior periphery being sized to fit within a tool holder; and said hollow member protecting the tool from damage such as marring or nicking, said hollow member includes two arcuate portions which define an elongated overall cylindrical configuration, said two arcuate portions define an arc dimension, said arc dimensions being different from one another.

18. The liner according to claim 17, wherein one arcuate portion defining an arc of about 200° and the other arcuate portion defining an arc of about 150°.

* * * * *